(12) United States Patent
Kaye et al.

(10) Patent No.: US 10,900,894 B2
(45) Date of Patent: Jan. 26, 2021

(54) OPTICAL PARTICLE COUNTER

(71) Applicant: ALPHASENSE LIMITED, Essex (GB)

(72) Inventors: Paul Henry Kaye, Hertfordshire (GB); Edwin Hirst, Hertfordshire (GB)

(73) Assignee: ALPHASENSE LIMITED, Great Notley (GB)

( * ) Notice: Subject to any disclaimer, the term of this patent is extended or adjusted under 35 U.S.C. 154(b) by 0 days.

(21) Appl. No.: 15/098,752

(22) Filed: Apr. 14, 2016

(65) Prior Publication Data

US 2016/0305872 A1 Oct. 20, 2016

(30) Foreign Application Priority Data

Apr. 14, 2015 (GB) .................................. 1506335.7

(51) Int. Cl.
| | |
|---|---|
| *G01N 21/47* | (2006.01) |
| *G01N 21/85* | (2006.01) |
| *G01N 15/14* | (2006.01) |
| *G01N 15/02* | (2006.01) |
| *G01N 15/10* | (2006.01) |
| *G01N 15/00* | (2006.01) |

(52) U.S. Cl.
CPC ..... *G01N 21/4738* (2013.01); *G01N 15/0205* (2013.01); *G01N 15/14* (2013.01); *G01N 15/1459* (2013.01); *G01N 21/85* (2013.01); *G01N 2015/0038* (2013.01); *G01N 2015/1075* (2013.01); *G01N 2015/1486* (2013.01); *G01N 2021/8578* (2013.01)

(58) Field of Classification Search
None
See application file for complete search history.

(56) References Cited

U.S. PATENT DOCUMENTS

| | | | | |
|---|---|---|---|---|
| 3,826,899 | A | * 7/1974 | Ehrlich | ............... G01N 15/147 377/10 |
| 4,179,218 | A | 12/1979 | Erdmann et al. | |
| 4,251,733 | A | * 2/1981 | Hirleman, Jr. | ............ G01P 5/20 250/575 |
| 4,885,473 | A | * 12/1989 | Shofner | ............ G01N 15/0205 250/574 |
| 5,043,591 | A | 8/1991 | Ludlow et al. | |
| 5,148,229 | A | * 9/1992 | Wiseall | ..................... G01P 5/20 356/28 |
| 5,367,474 | A | * 11/1994 | Auer | ..................... G01N 15/14 356/317 |
| 5,471,299 | A | 11/1995 | Kaye et al. | |

(Continued)

FOREIGN PATENT DOCUMENTS

| | | |
|---|---|---|
| GB | 2 278 679 | 12/1994 |
| GB | 2 317 228 | 3/1998 |

(Continued)

*Primary Examiner* — Kara E. Geisel
*Assistant Examiner* — Jarreas C. Underwood
(74) *Attorney, Agent, or Firm* — Nixon & Vanderhye P.C.

(57) ABSTRACT

An optical particle counter determines the velocity of particles passing through a particle detection zone, and thereby the velocity of gas flow, from both the measured time of flight of discrete particles and also the size of intensity peaks of scattered light. This is used to determine particle concentration and may be used to control an optional fan.

33 Claims, 3 Drawing Sheets

(56) References Cited

U.S. PATENT DOCUMENTS

| | | | | |
|---|---|---|---|---|
| 5,561,515 A | * | 10/1996 | Hairston | G01P 5/22 |
| | | | | 356/28 |
| 5,793,478 A | * | 8/1998 | Rader | G01F 1/661 |
| | | | | 356/28 |
| 5,943,130 A | * | 8/1999 | Bonin | G01N 15/0205 |
| | | | | 356/237.5 |
| 5,998,215 A | * | 12/1999 | Prather | H01J 49/0022 |
| | | | | 250/281 |
| 6,198,110 B1 | | 3/2001 | Kaye et al. | |
| 6,606,157 B1 | | 8/2003 | Kaye et al. | |
| 7,932,490 B2 | * | 4/2011 | Wang | G01N 15/0205 |
| | | | | 250/287 |
| 2002/0113963 A1 | * | 8/2002 | Gharib | G01N 15/0205 |
| | | | | 356/336 |
| 2005/0061968 A1 | * | 3/2005 | Green | H01J 49/025 |
| | | | | 250/288 |
| 2009/0071225 A1 | * | 3/2009 | Schilffarth | G01N 15/1425 |
| | | | | 73/1.02 |

FOREIGN PATENT DOCUMENTS

| | | |
|---|---|---|
| GB | 2 474 235 | 4/2011 |
| GB | 2 484 930 | 5/2012 |

\* cited by examiner

DETERMINATION OF PARTICLE TIME-OF-FLIGHT

OPTICAL PARTICLE COUNTER

This application claims priority to GB Patent Application No. 1506335.7 filed 14 Apr. 2015, the entire content of which is hereby incorporated by reference.

FIELD OF THE INVENTION

The present invention relates to the field of optical particle counters which employ optical scattering to detect fine particulates in air (or potentially another gas). In particular, the invention relates to optical particle counters in which particles are detected individually from light scattered as they pass through a relatively shallow light beam in order to measure the concentration of particles of a particular size range, or ranges, in an air sample.

BACKGROUND TO THE INVENTION

Issues concerning the invention will now be discussed with reference to the example application of detecting particles in air. The same approach may be used to detect particles in other gases.

Optical particle counters are known which detect the passage of particles through a beam of light (typically from a laser). Typically, a narrow column of air is passed through a light beam and the column of air is sufficiently narrow that the volume within which particles are detected, referred to as the particle detection zone, will only rarely contain more than a single particle. The pulse of light which is scattered by each respective particle is detected and the magnitude of each pulse of light is used to estimate the size of the particle which has been detected. Accordingly, the number of particles within various size ranges can be determined and the concentration of those particles in an air sample can be determined from the known velocity of the column of air through the light beam.

Various types of accurate optical particle counter are known in the art but they generally suffer the disadvantage of being complex and expensive, and are dependent on the quality of pumps to ensure a reliable and consistent velocity of gas.

GB 2474235 (Kaye) discloses a low cost optical particle counter with first and second detectors which detect scattering from particles passing through an optically defined detection zone having a first zone and a smaller second zone which is located wholly within the first zone. Particles passing through the first zone, but not the second zone, will be detected but cannot be sized reliably due to edge effects causing particles passing through the edge of the field of view to suffer some vignetting of the rays collected by a respective mirror. However, particles passing through the second zone can be detected and also sized reliably using a measurement of light scattered from the respective particle. GB 2484930 (Kaye and Hirst) discloses a low cost optical particle counter which employs a different optical configuration to define a first zone and a smaller second zone which is located wholly within the first zone. Advantageously, instead of delivering an air sample through a narrow delivery tube in the manner of known optical particle counters, the particles can pass through a wider chamber and the particle detection region may be only a small, and typically central, part of the cross section through which air flows, giving a relatively uniform air flow rate without the drag experienced close to the wall of the chamber. Such devices do not require a pump or other gas flow generator, and if they do have such a device they do not require the gas flow rate to be accurately controlled, thereby enabling provision of a low cost device. Nevertheless, they do require to accurately measure the velocity of particles through the particle detection zone.

The invention addresses the technical problem of accurately measuring the velocity of particles through the particle detection zone of an optical particle counter, to thereby avoid the need for or to reduce the cost and complexity of the fan, pump or other device used to pass air through the optical particle counter.

SUMMARY OF THE INVENTION

According to a first aspect of the invention there is provided an apparatus for the measurement of gas-borne particles in a gas sample, the apparatus comprising a scattering chamber having an inlet and an outlet, a radiation source for generating a beam of radiation through the scattering chamber, at least part of which forms a particle detection zone, a detector for detecting the intensity of radiation from the radiation source which is scattered by particles passing through the particle detection zone, and a processing circuit configured to determine the presence and size of particles in a gas sample passing through the particle detection zone from the variation with time of the measured intensity of radiation from the radiation source scattered by individual particles and detected by the detector, wherein the processing circuit determines a parameter related to the velocity of the detected particles taking into account both measurements of the intensity of radiation scattered by individual particles in the particle detection zone and detected by the detector and measurements of the period of time for which radiation scattered by individual particles is detected by the detector.

Typically, the passage of a particle through the particle detection zone leads to a discrete pulse in the measured intensity of radiation. This enables the presence of individual particles to be detected. The measured intensity of radiation during the discrete pulse (e.g. the peak intensity of radiation) enables the size of individual particles to be measured. On some occasions, two or more particles may pass through the particle detection zone, which can interfere with accurate measurement, but the dimensions of the apparatus are typically configured to minimise the frequency of this occurrence.

The parameter related to the velocity of the detected particles may be a numerical value representative of (e.g. proportional to or inversely proportional to) the velocity of the detected particles. However, the parameter related to the velocity of the detected particles may, for example, be a (typically numerical) value representative of the difference between the velocity of the detected particles and a predetermined target velocity. Such a parameter can be used to provide negative feedback to control the speed of a fan (where present). The parameter related to the velocity of the detected particles may, for example, be a signal (carried by one or more wires) and representative of an overspeed, underspeed and/or target speed condition.

The parameter related to the velocity of the detected particles may be calculated by calculating the velocity of a plurality of individual particles and processing (e.g. averaging over a period of time, for example, calculating the arithmetic mean, geometric mean, median or mode over a period of time) the individually calculated velocity of the plurality of particles. The parameter relative to the velocity of the detected particles may calculated from the time of flight of particles having a value of the measured intensity within at least one predetermined range, for example, by processing (e.g. averaging over a period of time, for example, calculating the arithmetic mean, geometric mean, median or mode over a period of time) the measured time of flight for particles having a measured intensity (e.g. peak intensity) within one or more different ranges of value (indicative of different sizes of particles). In this case, taking into account a measurement of the intensity of radiation scattered by particles in the particle detection zone and detected by the detector may comprise categorising individual particles dependent on said measurement of intensity.

Typically, the processing circuit calculates a particle concentration taking into account said parameter related to the velocity of detected particles. The particle concentration may be the concentration of particles within one or more defined size ranges. The particle concentration may be a mass concentration (mass per unit volume). Typically, the processing circuit calculates at least one of, at least two of, or all three of measurements of $PM_1$, $PM_{2.5}$, $PM_{10}$ in the gas sample. The processing circuit may calculate a measurement of $PM_4$ in the gas sample.

Typically, the processing circuit determines a measurement of the time of flight of a particle through the beam of radiation thereby making measurements of the period of time for which radiation scattered by individual particles are detected by the detector. This may, for example, be determined by measuring the period of time for which the intensity of the radiation exceeds a threshold (due to the passage of a single particle through the particle detection zone).

The measurement of the time of flight is affected by the velocity of the particle through the beam of radiation and the size of the respective particle. The intensity of radiation detected by the detector due to scattering from the respective particle is also function of the size of the respective particle. Accordingly, by taking into account both a measurement of the intensity of radiation detected by the detector and a measurement of the period of time for which radiation scattered by particles is detected by the detector, independent measurements of the velocity and size of particles can be obtained. The measurement of velocity is more accurate than if time of flight alone was used to determine velocity.

The measurements of the intensity of radiation scattered by individual particles may be measurements of the peak intensity of radiation scattered by the respective particles (during a said pulse). However, the measurements of the intensity of radiation scattered by individual particles may be another measurement indicative of the size of the respective particles. For example, the measurements of the intensity of radiation scattered by individual particles may be measurements of the integral of the intensity of radiation for the duration of the pulse of radiation arising from scattering from the respective particle.

The apparatus may comprise a gas flow generator, for example a pump or a fan, which causes the gas sample to flow through the scattering chamber such that at least some of the gas sample passes through the particle detection zone. For example, there may be natural flow of gas through the scattering chamber. In some embodiments, wherein the apparatus does comprise a gas flow generator, the gas flow generator is not controlled (e.g. the speed of a fan or displacement of a variable displacement pump is not controlled) responsive to the determined parameter related to the velocity of detected particles. Nevertheless, a gas flow generator is not essential to the invention, for example where the apparatus is located in a flowing gas, or where the apparatus is moved through a gas.

Accordingly, in some embodiments, the apparatus does not have means (such as a gas flow generator) to control the gas flow rate through the particle detection zone. In these cases, the concentration of particles can be determined taking into account the calculated parameter related to the velocity of particles.

The gas flow generator may be controllable to vary the velocity of the gas sample through the particle detection zone. For example, the gas flow generator may comprise a variable speed fan or a variable displacement pump. A variable speed fan may comprise an impeller driven by a motor so that the speed of rotation of the impeller is variable. A variable displacement pump may pump gas with a rate of displacement which varies with the speed control input.

The gas flow generator may be controlled to regulate (e.g. vary, or maintain) the velocity of the gas sample through the particle detection zone responsive to the measured velocity of particles. For example, if the velocity of particles (represented by the parameter related to the velocity of the particles) falls below a threshold, the gas flow generator may be controlled to increase the velocity of the gas sample through the particle detection zone. If the measured concentration of particles or the rate of particle detection events exceeds a threshold, the speed control input may be varied to increase the velocity of the gas sample. Thus the velocity of the gas sample through the particle detection zone can be increased if, given the concentration of particles in the air sample, the rate of particles being detected is too low to give a measurement of a required level of accuracy. However, the gas flow generator may operate with lower power (e.g. where the gas flow generator is a fan, the speed of rotation of the impeller may be reduced) at other times, to conserve energy. In other embodiments, the gas flow generator is controlled to maintain a target velocity of the detected particles (and therefore a target velocity of the gas sample).

The particle detection zone is typically formed by at least part of one single beam of radiation. The radiation source is typically configured to generate said one single beam of radiation through the scattering chamber, at least part of which forms the particle detection zone. The detector is typically configured to detect the intensity of radiation from the radiation source which is scattered by particles passing through the particle detection zone of said single beam of radiation. The processing circuit typically determines the parameter related to the velocity of the detected particles taking into account both measurements of the intensity of radiation scattered by individual particles in (e.g. passing through) the particle detection zone of said single beam of radiation and detected by the detector and measurements of the period of time for which radiation scattered by individual particles in (e.g. passing through) the particle detection zone of said single beam of radiation is detected by the detector.

Scattering of radiation by an (e.g. each) individual particle in (e.g. passing through) the particle detection zone (of the (single) beam of radiation) may result in a single pulse of radiation being detected by the detector. The processing circuit may determine a parameter related to the velocity of a (e.g. each) detected particle taking into account both measurement of the intensity of a single pulse of radiation scattered by the (e.g. each) individual particle in the particle detection zone and detected by the detector and measurement of the period of time for which the single pulse of radiation scattered by the (e.g. each) individual particle is detected by the detector. Accordingly, the processing circuit may determine a parameter related to the velocity of detected particles taking into account both measurements of the intensity of single pulses of radiation scattered by individual particles in the particle detection zone and detected by the detector and measurement of the period of time for which the single pulses of radiation scattered by the individual particles are detected by the detector.

Scattering of radiation by an (e.g. each) individual particle in (e.g. passing through) the particle detection zone (of the (single) beam of radiation) may result in a discrete pulse of radiation being detected by the detector. The processing circuit may determine a parameter related to the velocity of a (e.g. each) detected particle taking into account both measurement of the intensity of a discrete pulse of radiation scattered by the (e.g. each) individual particle in the particle detection zone and detected by the detector and measurement of the period of time for which the discrete pulse of radiation scattered by the (e.g. each) individual particle is detected by the detector. Accordingly, the processing circuit may determine a parameter related to the velocity of detected particles taking into account both measurements of the intensity of discrete pulses of radiation scattered by individual particles in the particle detection zone and detected by the detector and measurement of the period of time for which the discrete pulses of radiation scattered by the individual particles are detected by the detector.

The particle detection zone may have a cross sectional area of less than 10%, or less than 5%, or less than 2% of the cross sectional area of the scattering chamber through which the gas sample flows in use.

The depth of the beam of radiation at the particle detection zone is typically less than 10%, less than 5% or less than 1% of the minimum breadth of the particle detection zone.

The depth of the beam of radiation at the particle detection zone is typically between 10 and 75 micrometers, preferably between 20 and 50 micrometers. The apparatus typically calculates a measurement of the concentration of particles up to a maximum size, wherein the maximum size is typically less than an optical diameter of 50 micrometers. By optical diameter we refer to the diameter of a spherical particle of predetermined (standard) optical properties which would give the same measured intensity of scattered radiation. Typically, the ratio of the depth of the beam of radiation at the particle detection zone to the maximum optical diameter of particle which is detected by the apparatus is less than 10, and typically less than 5. A beam of limited depth is advantageous as this increases the maximum concentration of particle which can be reliably measured without an excessive frequency of two or more particles being in the particle detection zone respectively. However, the smaller the depth of the particle detection zone, relative to the maximum size of particle which is to be detected, the less accurate a measurement of velocity would be obtained from time of flight alone.

Typically, the distance between the outer edge of particle detection zone and the wall or walls of the scattering chamber is at least the same as, or at least double, or at least 5 times or at least 10 times, the maximum breadth of the particle detection zone. Preferably, the particle detection zone is centrally located within the region of the scattering chamber through which the gas sample flows in use.

By the depth of the beam of radiation we refer to the dimension parallel to the direction of flow of the gas sample in use within which the intensity is at least $1/e^2$ of the peak intensity. By the minimum or maximum breadth of the beam of radiation we refer to the minimum or maximum width respectively of the particle detection zone in a plane perpendicular to the direction of flow of the gas sample in use. Where the particle detection zone has a circular cross section, the minimum and maximum breadth will be the diameter of the particle detection zone.

The radiation is typically electromagnetic radiation and may for example be visible light, infra-red light or ultra-violet light. The apparatus may comprise one or more further detectors which detect scattered light from the particles, for example as described in GB 2474235 (Kaye) or GB 2484930 (Kaye and Hirst). The detector may comprise a plurality of photosensors.

The invention extends in a second aspect to a method for measuring gas-borne particles in a gas sample, comprising providing a scattering chamber having an inlet and an outlet, generating a beam of radiation through the scattering chamber, at least part of which forms a particle detection zone, detecting the intensity of radiation from the radiation source which is scattered by particles passing through the particle detection zone, using a detector, and determining the presence and size of particles in a gas sample passing through the particle detection zone from the variation with time of the measured intensity of radiation from the radiation source scattered by individual particles, wherein the method further comprises determining a parameter related to the velocity of the detected particles taking into account both measurements of the intensity of radiation scattered by individual particles in the particle detection zone and detected by the detector and measurements of the period of time for which radiation scattered by individual particles is detected by the detector.

Typically, the method comprises calculating a particle concentration taking into account said parameter related to the velocity of detected particles. The particle concentration may be the concentration of particles within one or more defined size ranges. Typically, the method comprises calculating at least one of, at least two of, or all three of measurements of $PM_1$, $PM_{2.5}$, $PM_{10}$ in the gas sample. A measurement of $PM_4$ in the gas sample may be calculated.

Typically, the method comprises calculating a measurement of the time of flight of a particle through the beam of radiation. This may, for example, be determined by measuring the period of time for which the intensity of the radiation exceeds a threshold (due to the passage of a single particle through the particle detection zone).

It may be that the measurement of the intensity of radiation is the peak intensity of radiation scattered by particles (during a said pulse). It may be that that the measurement of the intensity of radiation is a measurement of the integral of the intensity of radiation for the duration of the pulse of radiation arising from scattering from the respective particle.

The method may comprise controlling a gas flow generator, for example a pump or a fan, to regulate the velocity of the gas sample through the scattering chamber.

The method may comprise varying the rate of flow of gas responsive to the measured velocity of particles. The method may comprise varying a control input of the gas flow generator to maintain a target velocity of particles. However, in some embodiments the method does not include controlling the velocity of the gas sample through the scattering chamber (and therefore the particle detection zone) responsive to the determined parameter related to the velocity of detected particles. Thus, there may, or may not be (negative) feedback control of gas flow velocity through the scattering chamber and particle detection zone, responsive to the determined parameter related to the velocity of particles.

Further optional features of the second aspect of the invention correspond to those discussed above in relation to the first aspect of the invention.

DESCRIPTION OF THE DRAWINGS

An example embodiment of the present invention will now be illustrated with reference to the following Figures in which.

DETAILED DESCRIPTION OF AN EXAMPLE EMBODIMENT

First Example—Correcting Particle Concentration for Particle Velocity

Figure 1:
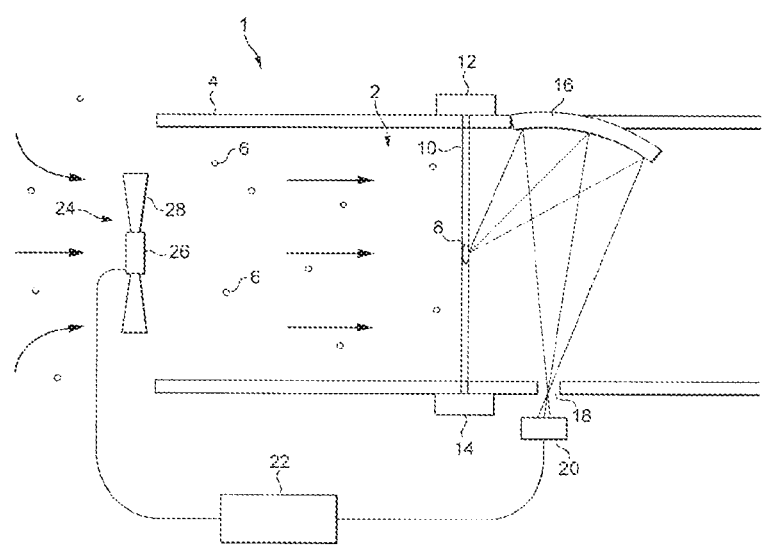
FIG. 1 is a schematic diagram of an optical particle counter according to the present invention.

With reference to FIG. 1, an optical particle counter 1 has a scattering chamber 2, in this example defined by a tube 4 through which an air sample flows in use, bearing particles 6 to be detected. The scattering chamber includes a particle detection zone 8. The optical particle counter counts and determines the size of particles which transit the particle detection zone. A laser beam 10, functioning as the beam of radiation, is generated in use by laser 12 and extends through the scattering chamber to a beam dump 14. A parabolic reflector 16 directs light from the laser beam which is scattered by particles in the particle detection zone through an aperture 18 to a photodetector 20 (the detector, for example a photodiode) which outputs a measured light intensity signal to a processing circuit 22. One skilled in the art will appreciate that the processing circuit may be implemented by a microprocessor or microcontroller executing a computer program stored on a solid state data storage device, typically in communication with an analogue to digital converter which converts an intensity signal received from the photodetector into a time varying digital signal, or by an electronic circuit.

The optical particle detector also has a fan 24 with an electric motor 26 and impeller blades 28. In some embodiments, the fan rotates at a variable speed defined by a speed control input signal received from the processing circuit. Nevertheless, in this example particle concentrations are calculated taking into account the measured velocity of particles, in some embodiments, the fan will be controlled or receive a fixed input signal, for example there may be a constant potential difference applied to the motor.

The particle detection zone is a part of the laser beam and is defined by the configuration of the parabolic reflector, the detector and the aperture. Accordingly, the particle detection zone is an optically defined particle detection zone. The particle detection zone may be wholly located within an outer particle detection zone defined by an additional reflector, detector and aperture, for example. The flow of gas through the particle detection zone is laminar. The velocity of particles through the particle detection zone is substantially perpendicular to the laser beam and is substantially the same as the gas flow vector.

The laser beam is shallow. In an example embodiment, to detect particles of up to 40 micrometer diameter, the laser beam has a depth of 100 micrometers. In another example embodiment, to detect particles of up to 15 micrometer diameter, the laser beam has a depth of 30 micrometers.

Figure 2:
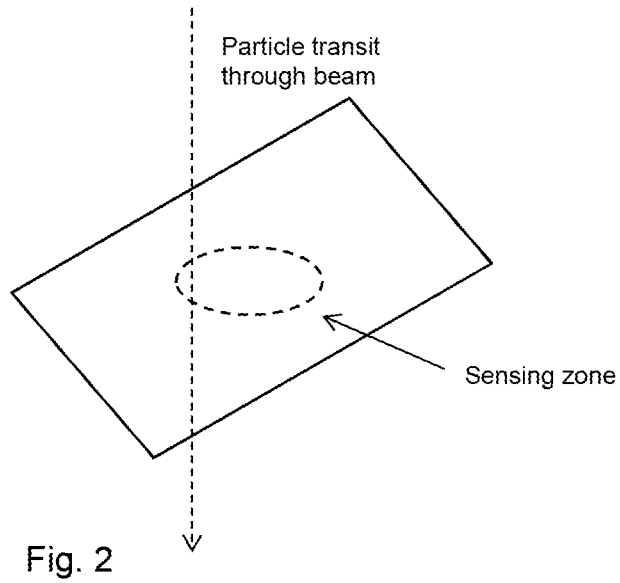
FIG. 2 is a perspective view of a laser beam showing an optically defined particle detection zone.
Figure 3:
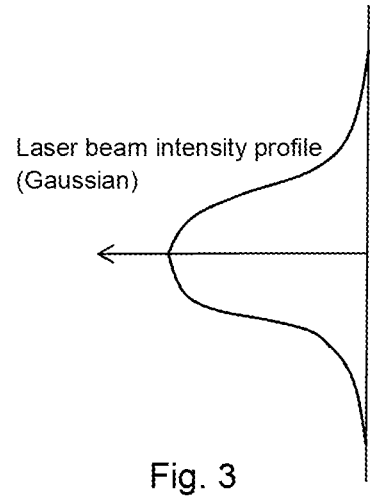
FIG. 3 is a graph of the variation in laser beam intensity with depth.

The intensity profile of the laser beam in the particle detection zone varies with depth according to a Gaussian distribution (FIG. 3). Hence, as an individual particle passes through the particle detection zone (FIG. 2) it will generate a discrete peak in the intensity of scattered light detected by the detector. The processing circuit detects the particles by detecting these discrete peaks and also determines both the peak intensity of each peak (functioning as the measurement of intensity of radiation) and the time of flight of each particle, being the period of time for which the measured intensity exceeds a threshold (functioning as the measurement of the period of time for which radiation scattered by the respective particle is detected by the detector).

The time of flight of each discrete particle depends on the velocity of the particle. However, it also depends to some extent on the size of each particle. This is because larger particles will have a longer path in which they scatter sufficient light for the intensity at the detector to exceed the threshold than smaller particles, as a consequence of the Gaussian intensity profile of the laser beams in the direction of particle travel.

Figure 4:
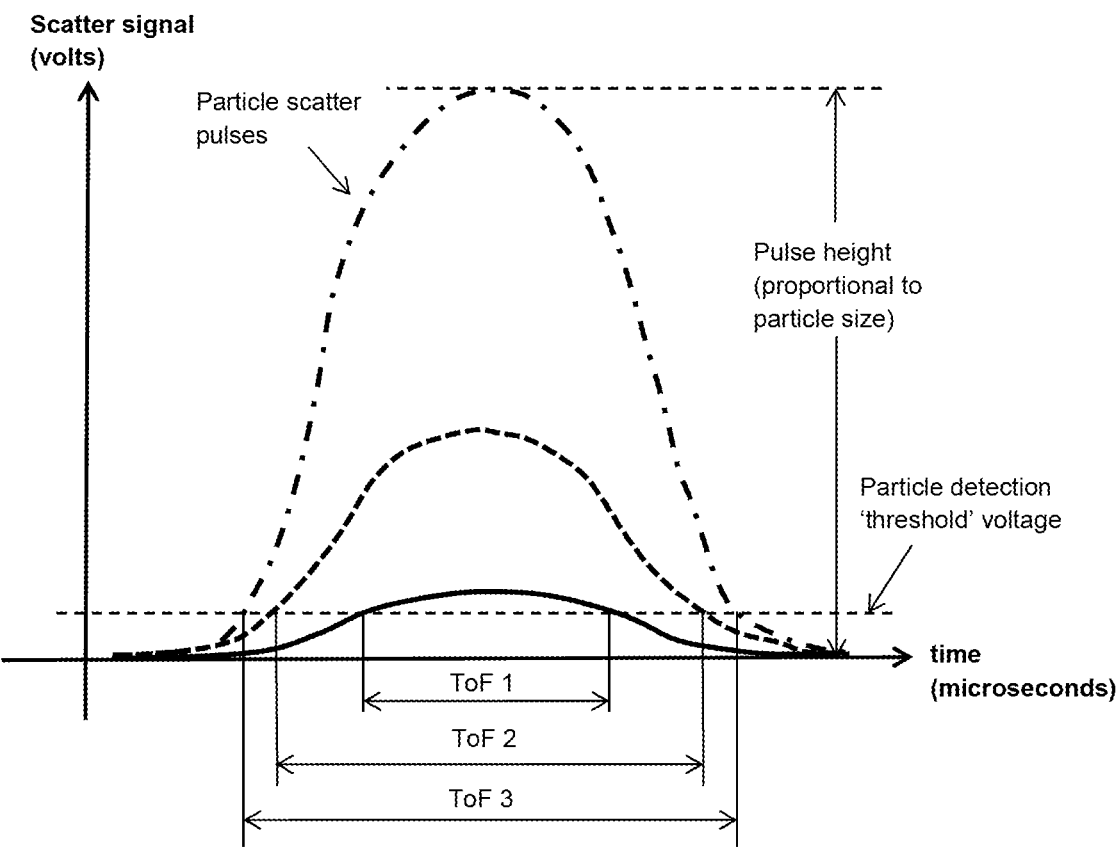
FIG. 4 is a graph of the variation in intensity of scattered light detected by the detector for particles of a first size (solid line), a larger second size (dashed line) and a still larger third size (dashed and dotted line)

Further, the amplitude of this peak varies with the size of the particle which is detected. FIG. 4 shows how the amplitude varies for a particle of a first size (solid line), a second larger size (dashed line) and a third still larger size (dashed and dotted line).

In some embodiments, in order to calculate the velocity of a detected particle, or another parameter related to the velocity of detected particles, the processing circuit processes both the measured peak amplitude and the measured time of flight for each individual particles. The calculated velocity will therefore be more accurate than would be obtained by processing only the measured time of flight.

Figure 5:
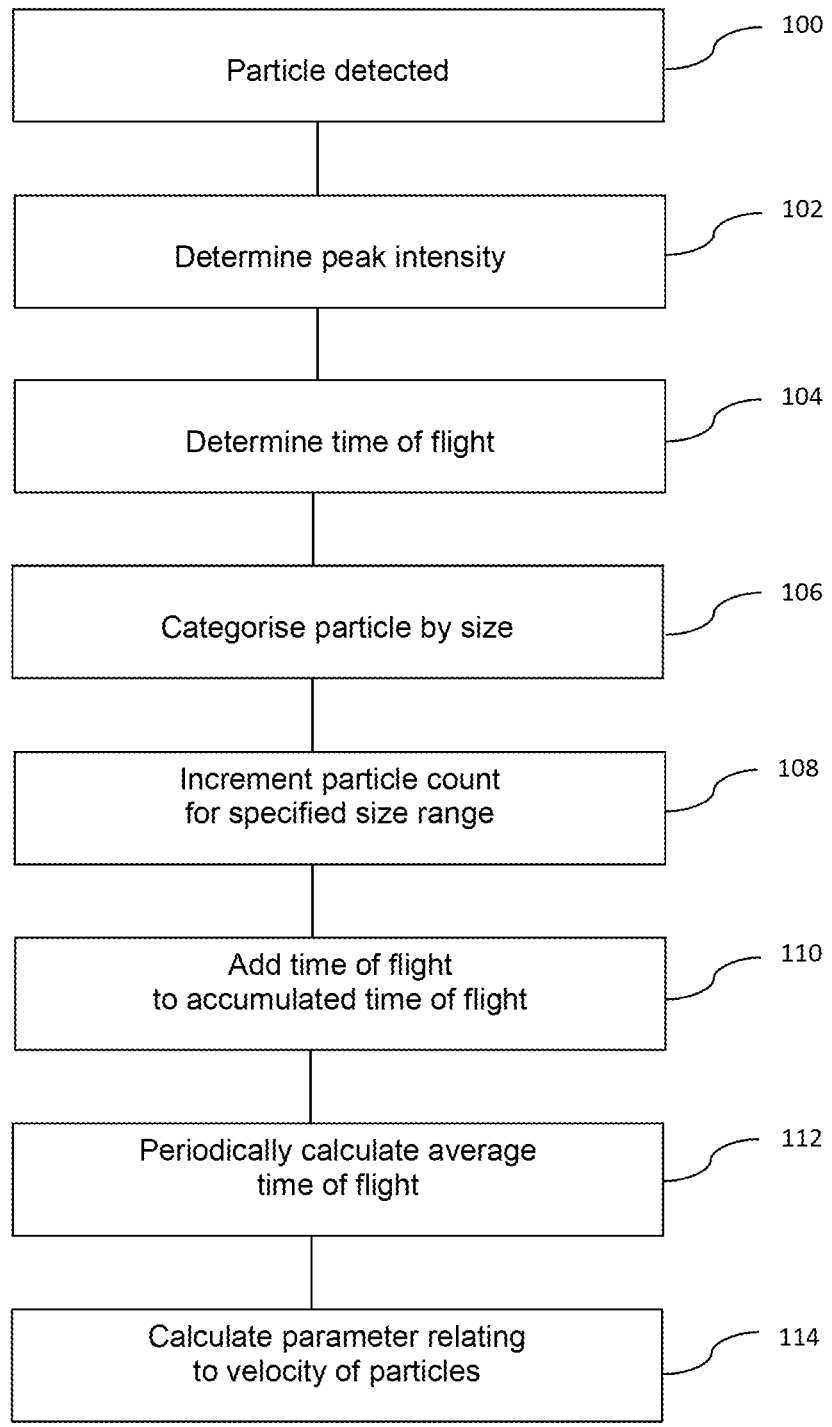
FIG. 5 is a flow chart of a process for calculating a parameter relating to the velocity of particles.

However, in this example, the velocity is determined from the mean time of flight of particles in one or more size ranges. With reference to FIG. 5, when a particle is detected 100, the peak intensity of resulting intensity pulse is determined 102 and so is the time of flight 104. The particle is then categorised 106 into one of 16 (for example) ranges of size from the peak intensity (larger peak intensities being representative of larger particles). A stored count of particles in the respective size range is incremented 108 and the measured time of flight is added 110 to an accumulated sum of measured times of flight. Periodically, the average time of flight is calculated 112 by dividing the accumulated sum of measured times of flight by the stored count of particles. The velocity of the particles (and therefore the gas sample) is then calculated 114 from the average time of flight of the particle in one or more of the size ranges. It may be that the average time of flight in only one of the size range is used to calculate the velocity, for example a size ranges with a relatively high number of particle detection events, but several or all of the size ranges may be used.

In terms of the relationship between the time of flight of particles of different size, the logarithm of peak height is proportional to the time of flight squared. The precise relationship between average time of flight and the velocity of the particles depends on the level of the threshold used to determine time of flight and on the intensity profile of the laser beam. In the limit, for small particles, the velocity is inversely proportional to the time of flight, but as particles get larger, the velocity will be gradually greater than would be predicted from the reciprocal of the time of flight. Generally time of flight should be multiplied by a factor proportional to the square root of the inverse logarithm of peak height, expressed in appropriate units, to give a corrected time of flight and the velocity is inversely proportional to this corrected time of flight.

In practice, it is preferable to calibrate the relationship between average time of flight and velocity for particles in each size range for a given configuration of particle counter and to store the parameters of a calibration function. This enables velocity to be calculated from the time of flight of particles in one or more of the size ranges. In some embodiments, the processing circuit calculates the particle size and velocity by looking up particle sizes and velocities for specific measured time of flight and peak intensity values stored in a look up table in a solid state memory. If the measured time of flight and peak intensity do not correspond with values for which particle size and velocity is stored in the look up table, the processing circuit can interpolate between the values stored for similar values of time of flight and peak intensity.

As with known optical particle counters, a measurement of particle concentration is calculated. This may be the number concentration of particles (number per $cm^3$ or per $m^3$) in the specified size range in the body of air from which the air sample is drawn. However, a common output is particle mass density (mass per $cm^3$ or per $m^3$), which is obtained by summing, for each of the plurality of ranges of particle size, the product of the number of particles found in a predetermined period of time times a predetermined constant for the particle size range (equal to the average mass per particle per unit volume per unit velocity for that particle size range) times the calculated velocity.

By summing this product for particles within only some of the particle size ranges corresponding to size ranges which are important parameters for environmental monitoring, e.g. some or all of $PM_1$, $PM_{2.5}$, $PM_{10}$, the apparatus can calculate a plurality of different mass concentrations at once.

Accordingly, because the measurement of particle velocity is accurate, the calculation of concentration is reliable despite variation in the velocity. Thus, the fan (or pump can) be a relatively low cost device. The fan (or pump) can be controlled, for example, to speed up when the particle density is low, to obtain more particle detection events and therefore improve accuracy, and to slow down when the particle density is higher, to conserve power.

However, in some embodiments, the fan (or pump) speed will not be controlled at all. It may vary over time or in response to parameters such as temperature but the resulting variation in the velocity of particles is taken into account when calculating particle concentration.

In configurations where the gas sample will anyway flow through the device (for example where the apparatus is included in a flowing gas stream) there may be no requirement for a fan or pump to be present at all.

The invention is especially useful with an optical particle counter as described in GB 2474235 (Kaye) or GB 2484930 (Kaye and Hirst), the contents of which are incorporated herein by virtue of this reference. Such devices have an outer particle detection zone within which particle detection zone 8 is enclosed. An additional reflector, detector and aperture are provided to define the outer particle detection zone. Particles which pass through the outer particle, and are detected only by the additional detector, may give inaccurate measurements of peak intensity and/or time of flight and so are disregarded. Particles which are detected only within particle detection zone 8 are used for measurement. Air flow is laminar and particle velocity is substantially the same as air flow velocity.

Devices of this type have the advantage of not requiring a narrow delivery tube, which might provide flow resistance or become clogged, to define the particle detection region. They also have the advantage that the particle detection region can be a small and typically central portion of the overall cross section of the scattering chamber through which the sample gas flows, so that the velocity of air flow is more constant, avoiding the edge effects which arise near tube walls. Furthermore, they are not dependent on either controlling air flow rate or measuring it with a separate measurement device, thereby providing a simple and accurate device. Particle velocity is substantially the same as gas flow velocity. Nevertheless, they do require accurate measurement of the velocity of the air flow and so the invention is especially useful in this case.

Second Example—Negative Feedback Fan Speed Control

In a second example, a control input which affects the speed of the fan motor (e.g. voltage applied to an electric motor) is constantly varied by the processing circuit to maintain the particle velocity at an optimum value. This can be achieved by comprising the measured average time of flight for particles in one or more of the size ranges with a reference value indicative of the target particle velocity. A single size range can be used or the measured average time of flight for two or more of the size ranges can be processed together (e.g. averaged) and compared with reference values.

Thus, a value indicative of the difference between the velocity of the particles and a target velocity can be determined and applied to the control input of the fan motor, thereby provide negative feedback control of the velocity of particles to obtain a desired target velocity. This value indicative of the difference by the velocity of particles and the target velocity may be a numerical value indicative of the difference, expressed as a digital number or an analogue voltage (for example) or may be a simple as a first value (e.g. a first potential difference) in response to an overspeed condition, a second value (e.g. a second potential difference) in response to an underspeed condition and optionally a third value (e.g. a third potential difference) in response to the velocity being within a target range.

In this example, as the particle velocity is controlled, it is not essential to take into account the measured velocity of particles when calculating the concentration of particles, however the measured velocity of particles may also be taken into account as discussed in the first example.

The invention claimed is:

1. An apparatus for the measurement of gas-borne particles in a gas sample, the apparatus comprising a scattering chamber having an inlet and an outlet, a radiation source for generating a beam of radiation through the scattering chamber, at least part of which forms a particle detection zone, a detector for detecting the intensity of radiation from said beam which is scattered by particles passing through the particle detection zone, and a processing circuit configured to determine the presence and size of particles in a gas sample passing through the particle detection zone from the variation with time of the measured intensity of a radiation pulse from said beam scattered by individual particles and detected by the detector and also configured to make measurements of a period of time for which the radiation pulse said beam scattered by individual particles is detected by the detector, wherein the processing circuit determines a parameter related to the velocity of detected particles utilizing both measurements of the intensity of the radiation pulse from said beam scattered by individual particles in the particle detection zone and detected by the detector and measurements of the period of time for which the radiation pulse in said beam scattered by individual particles is detected by the detector.

2. An apparatus according to claim 1, wherein at least one of the measurements of the period of time for which the radiation pulse in said beam scattered by individual particles is detected by the detector comprises measurement of the period of time for which the intensity of the radiation pulse from said beam scattered by the individual particles exceeds a threshold.

3. An apparatus according to claim 1, wherein the processing circuit calculates a particle concentration taking into account said parameter related to the velocity of detected particles.

4. An apparatus according to claim 3 which does not have a gas flow generator to control the gas flow rate through the particle detection zone, or which comprises a gas flow generator but which does not control the gas flow generator responsive to the determined parameter related to the velocity of detected particles.

5. An apparatus according to claim 3 wherein the apparatus is located in a flowing gas, the flowing gas including the gas sample, so that there is a natural flow of gas through the scattering chamber.

6. An apparatus according to claim 3 wherein the apparatus is movable through a gas so that so that there is a flow of gas through the scattering chamber, the flowing gas including the gas sample.

7. An apparatus according to claim 3 further comprising a gas flow generator for regulating the gas flow rate through the particle detection zone independently from the determined parameter related to the velocity of detected particles.

8. An apparatus according to claim 1, wherein an intensity profile of the beam of radiation in the particle detection zone varies with depth according to a Gaussian distribution.

9. An apparatus according to claim 1, wherein the processing circuit determines a measurement of the time of flight of a particle through the beam of radiation.

10. An apparatus according to claim 1, wherein the parameter relating to the velocity of the detected particles is calculated from the time of flight of particles having a value of the measured intensity within at least one predetermined range.

11. An apparatus according to claim 1, wherein the measurement of the intensity of the radiation pulse from said beam scattered by the respective particle is a measurement of the peak intensity of radiation from said beam scattered by the respective particle.

12. An apparatus according to claim 1, wherein the measurement of the intensity of the radiation pulse from said beam scattered by the respective particle is a measurement of the integral of the intensity of radiation pulse from said beam for the duration of the pulse of radiation in said beam arising from scattering from the respective particle.

13. An apparatus according to claim 1, comprising a gas flow generator which causes the gas sample to flow through the scattering chamber such that at least some of the gas sample passes through the particle detection zone.

14. An apparatus according to claim 13, wherein the gas flow generator is a fan.

15. An apparatus according to claim 13, wherein the gas flow generator is controlled to regulate the velocity of the gas sample through the particle detection zone responsive to the measured velocity of particles.

16. An apparatus according to claim 1, wherein the processing circuit calculates at least one of, at least two of, or all three of measurements of $PM_1$, $PM_{2.5}$, $PM_{10}$ in the gas sample.

17. An apparatus according to claim 1, wherein the depth of the beam of radiation at the particle detection zone is between 10 and 75 micrometers.

18. An apparatus according to claim 1, wherein the particle detection zone is centrally located within the region of the scattering chamber through which the gas sample flows in use.

19. An apparatus according to claim 1, wherein the particle detection zone is wholly located within an outer particle detection zone defined by an additional reflector, detector and aperture.

20. An apparatus according to claim 1 wherein the parameter related to the velocity of the detected particles is: (i) a numerical value representative of the velocity of the detected particles, or (ii) a numerical value representative of a difference between the velocity of the detected particles and a predetermined target velocity.

21. A method of measuring gas-borne particles in a gas sample, comprising providing a scattering chamber having an inlet and an outlet, generating a beam of radiation through the scattering chamber, at least part of which forms a particle detection zone, detecting the intensity of radiation from said beam which is scattered by particles passing through the particle detection zone, using a detector, making measurements of a period of time for which a radiation pulse in said beam scattered by individual particles is detected by the detector, and determining the presence and size of particles in a gas sample passing through the particle detection zone from the variation with time of the measured intensity of the radiation pulse from said beam scattered by individual particles, wherein the method further comprises determining a parameter related to the velocity of the detected particles utilizing both measurements of the intensity of the radiation pulse from said beam scattered by individual particles in the particle detection zone and detected by the detector and measurements of the period of time for which the radiation pulse in said beam scattered by individual particles is detected by the detector.

22. A method according to claim 21, wherein the measurement of the intensity of radiation pulse from said beam is the peak intensity of radiation pulse from said beam scattered by particles.

23. A method according to claim 21, comprising calculating a measurement of the time of flight of a particle through the beam of radiation from the period of time for which the intensity of the radiation pulse from said beam exceeds a threshold.

24. A method according to claim 23, wherein the parameter relating to the velocity of the detected particles is calculated from the time of flight of particles having a value of the measured intensity within at least one predetermined range.

25. A method according to claim 21, comprising calculating a particle concentration taking into account said parameter related to the velocity of detected particles.

26. A method according to claim 25, comprising calculating at least one of, at least two of, or all three of measurements of $PM_1$, $PM_{2.5}$, $PM_{10}$ in the gas sample.

27. A method according to claim 21, which does not include controlling the velocity of the gas sample through the scattering chamber, responsive to the determined parameter related to the velocity of detected particles.

28. A method according to claim 21, comprising controlling a gas flow generator to regulate the velocity of the gas sample through the scattering chamber.

29. A method according to claim 21 wherein the parameter related to the velocity of the detected particles is: (i) a numerical value representative of the velocity of the detected particles, or (ii) a numerical value representative of a difference between the velocity of the detected particles and a predetermined target velocity.

30. A method according to claim 21, wherein at least one of the measurements of the period of time for which the radiation pulse in said beam scattered by individual particles is detected by the detector comprises measurement of the period of time for which the intensity of the radiation pulse from said beam scattered by the individual particles exceeds a threshold.

31. An apparatus for the measurement of gas-borne particles in a gas sample, the apparatus comprising a scattering chamber having an inlet and an outlet, a radiation source for generating a beam of radiation through the scattering chamber, at least part of which forms a particle detection zone, a detector for detecting the intensity of radiation from said beam which is scattered by particles passing through the particle detection zone, and a processing circuit configured to determine the presence and size of particles in a gas sample passing through the particle detection zone from the variation with time of the measured intensity of a radiation pulse from said beam scattered by individual particles and detected by the detector and also configured to make measurements of a period of time for which the radiation pulse in said beam scattered by individual particles is detected by the detector, wherein the processing circuit determines a parameter related to the velocity of detected particles utilizing both measurements of the intensity of the radiation pulse from said beam scattered by individual particles in the particle detection zone and detected by the detector and measurements of the period of time for which the radiation pulse in said beam scattered by individual particles is detected by the detector, and wherein the particle detection zone has a cross sectional area of less than 10% of the cross sectional area of the scattering chamber through which the gas sample flows in use.

32. An apparatus for the measurement of gas-borne particles in a gas sample, the apparatus comprising a scattering chamber having an inlet and an outlet, a radiation source for generating a beam of radiation through the scattering chamber, at least part of which forms a particle detection zone, a detector for detecting the intensity of radiation from said beam which is scattered by particles passing through the particle detection zone, and a processing circuit configured to determine the presence and size of particles in a gas sample passing through the particle detection zone from the variation with time of the measured intensity of a radiation pulse from said beam scattered by individual particles and detected by the detector and also configured to make measurements of a period of time for which the radiation pulse in said beam scattered by individual particles is detected by the detector, wherein the processing circuit determines a parameter related to the velocity of detected particles utilizing both measurements of the intensity of the radiation pulse from said beam scattered by individual particles in the particle detection zone and detected by the detector and measurements of the period of time for which the radiation pulse in said beam scattered by individual particles is detected by the detector, and wherein the depth of the beam of radiation at the particle detection zone is less than 10% of the minimum breadth of the particle detection zone.

33. An apparatus for the measurement of gas-borne particles in a gas sample, the apparatus comprising a scattering chamber having an inlet and an outlet, a radiation source for generating a beam of radiation through the scattering chamber, at least part of which forms a particle detection zone, a detector for detecting the intensity of radiation from said beam which is scattered by particles passing through the particle detection zone, and a processing circuit configured to determine the presence and size of particles in a gas sample passing through the particle detection zone from the variation with time of the measured intensity of a radiation pulse from said beam scattered by individual particles and detected by the detector and also configured to make measurements of a period of time for which the radiation pulse in said beam scattered by individual particles is detected by the detector, wherein the processing circuit determines a parameter related to the velocity of detected particles utilizing both measurements of the intensity of the radiation pulse from said beam scattered by individual particles in the particle detection zone and detected by the detector and measurements of the period of time for which the radiation pulse in said beam scattered by individual particles is detected by the detector, and wherein the distance between the outer edge of particle detection zone and the wall or walls of the scattering chamber is at least the same as the maximum breadth of the particle detection zone.

* * * * *

UNITED STATES PATENT AND TRADEMARK OFFICE
CERTIFICATE OF CORRECTION

PATENT NO.         : 10,900,894 B2
APPLICATION NO.    : 15/098752
DATED              : January 26, 2021
INVENTOR(S)        : Kaye et al.

Page 1 of 1

It is certified that error appears in the above-identified patent and that said Letters Patent is hereby corrected as shown below:

In the Claims

Column 10, Lines 64 to 65 reads:
"…radiation pulse said beam…"

Should be corrected to read:
"…radiation pulse in said beam…".

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*